United States Patent [19]
Crittenden, Jr. et al.

[11] 3,727,069
[45] Apr. 10, 1973

[54] TARGET MEASUREMENT SYSTEM FOR PRECISE PROJECTILE LOCATION

[75] Inventors: Eugene Casson Crittenden, Jr., Monterey, Calif.; Richard Allan King, Singapore, Republic of Singapore; Thomas Clyde Andrews, Fresno, Calif.

[73] Assignee: Litton Systems Inc., Beverly Hills, Calif.

[22] Filed: July 21, 1971

[21] Appl. No.: 164,739

[52] U.S. Cl..............250/222 R, 250/209, 324/178, 273/102.2
[51] Int. Cl..............................................G01p 3/68
[58] Field of Search.............250/221, 222 R, 220 M, 250/209; 340/420; 324/178; 356/27, 28, 157, 159; 273/102.2

[56] References Cited

UNITED STATES PATENTS

| 3,513,444 | 5/1970 | Henderson et al.............356/157 X |
| 3,047,723 | 7/1962 | Knapp............................250/222 R |
| 3,197,646 | 7/1965 | Anders et al....................250/222 R |
| 3,025,406 | 3/1962 | Stewart et al.................250/222 R X |
| 3,567,951 | 3/1971 | Montgomery, Jr. .............250/222 R |

*Primary Examiner*—Walter Stolwein
*Attorney*—Alan C. Rose et al.

[57] ABSTRACT

A target system for measuring the location and diameter of a projectile in a frame of reference, including vertical and horizontal banks of light sources for projecting collimated beams of light across the target area, and corresponding vertical and horizontal banks of light receptors for indicating the location and diameter of a projectile passing through the target frame. A plurality of light receptors receive impinging light from each light source, each light receptor receiving a predetermined portion of a corresponding collimated light beam. When a light beam is interrupted by a projectile, the light receptors indicate the location and diameter of a projectile in increments less than the width of the collimated beam. Output signals from the light receptors are converted to numerically coded signals by coupling the output signals from the light receptors to a plurality of amplifiers, less in number than the number of light receptors, according to a predetermined coding pattern.

13 Claims, 8 Drawing Figures

PATENTED APR 10 1973 3,727,069

EUGENE C. CRITTENDEN, JR.
RICHARD A. KING
THOMAS C. ANDREWS
INVENTORS

BY Harold E. Sillmann

ATTORNEY

TARGET MEASUREMENT SYSTEM FOR PRECISE PROJECTILE LOCATION

BACKGROUND OF THE INVENTION

The invention pertains to the art of fabricating systems for measuring the position of a projectile passing through a target area.

Two typical devices of the prior art, described in U.S. Pat. Nos. 3,229,975 and 2,362,473, both require separate circuitry for each photo detector. The first mentioned device requires a separate pulse-sorting apparatus, a separate amplifier and separate switching apparatus for each photocell. The second device is subject to the same disadvantage that separate circuitry is required for each photo detector. Separate circuitry for each photo detector is both expensive and space consuming. The resolution of these devices in locating projectiles is limited to the diameter of each light beam. If the width of the light beams were decreased and the number of light sources and photocells were increased to obtain greater resolution, these devices would require additional circuitry for the additional photocells. Separate circuitry for each photo detector is both expensive and space consuming.

Another device of the prior art, described in U.S. Pat. No. 3,487,226, light beams and receptors to determine the time of passage of a projectile through a given target plane, and by arrangement of three light planes, utilizes these time signals as a means of determining the position of a projectile as it passes through the target planes. This device is subject to the disadvantage that three light planes and associated equipment are required to obtain the desired measurements.

Paper target sheets are another prior art device for testing the accuracy of rifles, guns and the like. Target sheets are inadequate for testing some types of ammunition which tend to exhibit precessional yaw at longer ranges. Such projectiles produce ragged, oversized tears in the surface of any target material, making accurate location extremely difficult. If a moving target sheet is utilized, the sheet must travel across the target area at a speed sufficient to guarantee that the next projectile can be unambiguously located. This requirement introduces severe mechanical problems and such a device may prove to be unreliable. The target system of the invention overcomes these and other disadvantages by providing an optical means for measuring the position of a projectile with accuracy exceeding that of devices of the prior art. Nor is the target system of the invention limited in its capability to score bursts in that it provides output signals which may be processed in a very short time by digital equipment.

SUMMARY OF THE INVENTION

In the preferred embodiment two rows of light sources are positioned along a pair of orthogonal measuring axes, one approximately vertical and one approximately horizontal, for projecting a series of collimated or parallel light beams across a target area, as viewed from the direction of the approaching projectile. A row of photocells is positioned opposite each row of light sources for receiving the parallel rays of light. Each beam of parallel rays from each light source has a predetermined width. Each beam of parallel rays is received by a plurality of photocells with each photocell therein receiving a predetermined portion of the beam width of light rays from a corresponding light source. Because each photocell receives a thin sheet of parallel rays of light along a measuring direction, each photocell produces a discrete output signal when blanked by an object interrupting the parallel rays of light. The passage of a projectile which interrupts the light impinging upon a series of photocells results in a plurality of discrete output signals indicative of the location of the projectile along a measuring direction and the diameter of the projectile.

A plurality of amplifiers are coupled to receive discrete signals from a plurality of photocells according to a predetermined coding pattern for producing numerically coded output signals indicating the location of blanked photocells in a predetermined numbering system. The individual photocells along each measuring axis are divided into numbered regions with each region having an equal predetermined number of photocells. The output signals from all the photocells in each region are coupled to a corresponding amplifier for producing an indication whether a projectile has blanked a light beam to any of the photocells in the region. The location of the projectile is further pinpointed by dividing the photocells of each region into zones. There is a corresponding amplifier for each zone. The output signals from the photocell in the Nth zone of each region is coupled to a corresponding amplifier. For example, the output of the second photocell in each region is coupled to the same amplifier. As discussed above the prior art devices are subject to the disadvantage of requiring an output circuit for each corresponding photocell. This disadvantage is overcome by utilizing each amplifier to process signals from a number of photocells so that the total number of amplifiers required is far fewer than the number of photocells. The subject device has the further advantage that numerically coded output signals may be processed by digital equipment.

An indication of the velocity and the trajectory of a projectile may be obtained by utilizing two adjacent target measuring systems so that a projectile must pass through the target areas of both. The difference in time between output signals of one system and the other provide an indication of the velocity of a projectile. The position where the projectile passes through each target plus the location of the origin of the projectile may be used to calculate the approximate trajectory of a projectile. Thus position and trajectory information may be obtained from a device having only two light planes.

It is an object of the invention to provide a targeting system producing discrete numerically coded output signals for indicating the position and diameter of a projectile passing through the target frame.

Another object of the invention is to provide a target system capable of scoring bursts of projectiles passing through the target frame in rapid succession.

Still another object of the invention is to provide a target system capable of measuring the location of a projectile passing through the target frame with extreme accuracy.

Yet another object of the invention is to provide a target system capable of measuring the location in a target frame of projectiles having a yaw attitude.

A further object of the invention is to provide a target system capable of measuring the locations of projectiles having high velocities.

A still further object of the invention is to provide a target system for providing signals from which the velocity of a projectile and the approximate trajectory may be calculated.

It is also an object of the invention to provide a target system capable of measuring the location of projectiles which themselves emit light, such as tracer bullets.

BRIEF DESCRIPTION OF THE DRAWINGS

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

DESCRIPTION OF THE PREFERRED EMBODIMENTS

Figure 1:
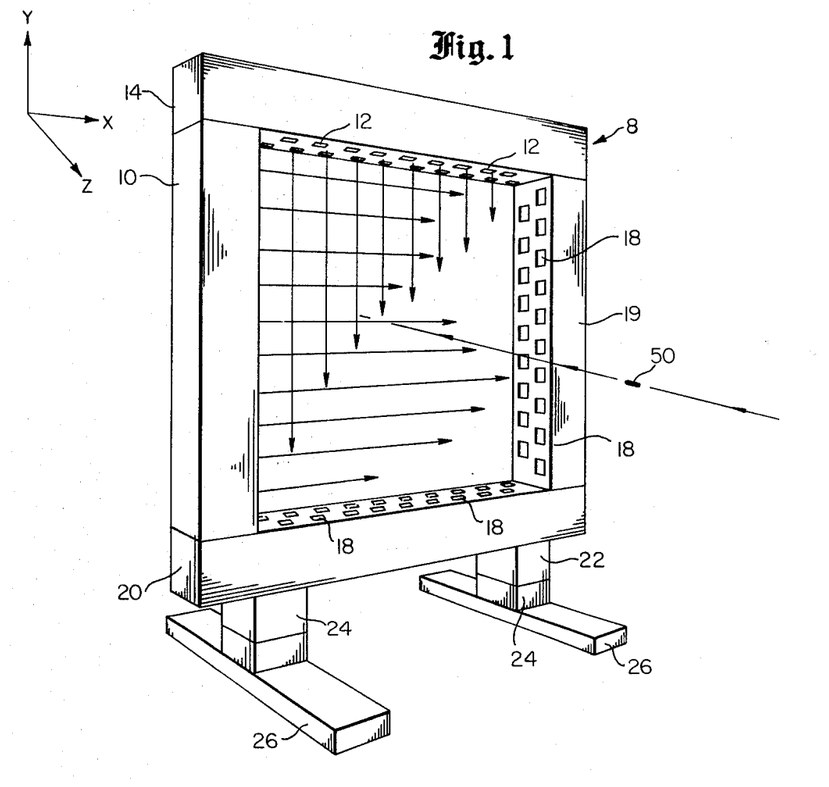
FIG. 1 is a perspective view of the target system of the invention.

Referring now to the drawings, there is shown in FIG. 1, one embodiment of a target frame 8 for supporting and housing the target measuring system of the invention. Light source array 10 contains a plurality of identical light sources 12 which are spaced along the $y$ axis shown in FIG. 1. Light source 12 may be an incandescent lamp with a collimated beam or it may be a laser. Each light source 12 is positioned in checkerboard fashion with respect to adjacent light sources 12 for ease in mounting. Source array 14 is identical to source array 10 with a plurality of light sources 12 positioned along the $x$ axis. The light sources 12 in source array 10 project parallel beams of light toward light receptor array 18. Each light source 12 directs a beam of collimated light toward a corresponding light receptor group 18. Receptor groups 18 are positioned on frame 19 to provide coverage along the $y$ axis. Each receptor group 18 contains a plurality of light gathering elements which are sensitive enough to detect the decrease in light intensity when a light beam is interrupted by a projectile. Receptor array 20 is identical to receptor array 18. Each light source 12 in source array 14 directs light along the $y$ axis to a corresponding receptor group 18 in receptor array 20. The frames may be supported in any suitable fashion. FIG. 1 shows receptor array 20 resting on a pair of identical legs each comprising a block 22, a shock isolator 24 and a base 26.

Figure 2A:
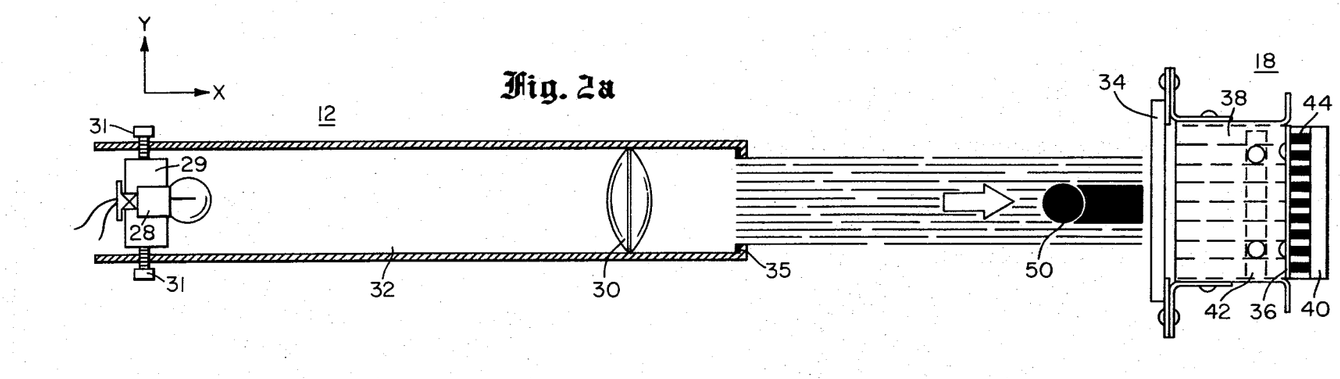
FIGS. 2a and 2b are each side views of a cross section of two embodiments of a light source and a corresponding light receiving means, the light receiving means having a plurality of light receptors.

Consider now the detailed construction of each light source 12 and corresponding receptor group 18. In FIG. 2a there is shown a preferred embodiment of a light source 12 for producing a light beam collimated in at least one direction. Light source 12 comprises an incandescent lamp 28 and a spherical lens 30. These components of light source 12 may be supported, for example, by tube 32. Lamp 28 may be a line filament-type lamp or it may be a sound reproducer bulb of the type used in motion picture projectors. The diameter of the filament may be in the order of 0.010 inch. Lens 30 is a convergent spherical lens for focusing the beam of light from lamp 28 into parallel sheets of light extending over a band of approximately 1-½ inches. An achromatic spherical lens having a focal length of approximately 5-¾ inches and a diameter of approximately 1-½ inches may be used. In the preferred embodiment lens 30 is spaced approximately 5-¾ inches from lamp 28 so that lamp 28 is approximately located at the focal point of lens 30. Lamp 28 is supported by holder 29. Screws 31 adjust the position of lamp 28.

Figure 2B:
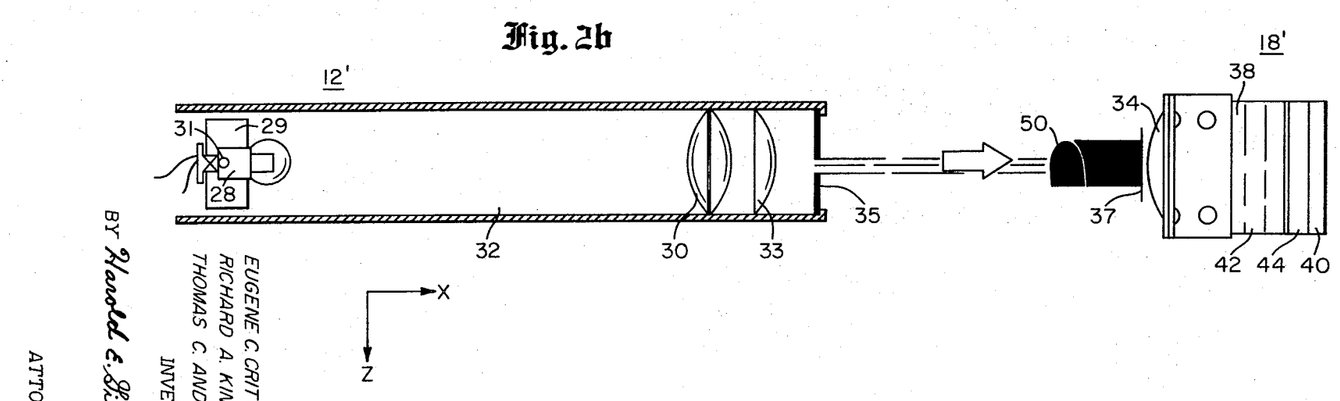

In an alternative embodiment light source 12', shown in cross section in the $x$–$z$ plane in FIG. 2b, cylindrical lens 33 with the axis of the cylinder along the $y$ axis, focuses an impinging beam of light in one direction along the $z$ axis. For example, the collimated beam of light focused by lens 30 in the $y$ direction is not altered by lens 33. The beam transmitted by lens 30 is spread over approximately 1-½ inches in the $y$ direction. In the orientation shown lens 33 focuses the beam light in the $z$ direction to a narrow beam width in order to increase the intensity of the beam. Lens 33 forms a real image of the filament of lamp 28 on the photo detector described below thereby increasing the amount of light impinging on a corresponding light receptor group 18'. Diaphragm 35 has an aperture which limits the width of the light beam in the $x$–$z$ plane.

In the preferred embodiment each light receptor group 18, shown in FIG. 2a, comprises a cylindrical focusing lens 34 with the axis of the cylinder along the $y$ axis, a slit mask 36, a diaphragm 37, a plurality of baffles 38, a photocell array 40 all supported by housing 42. Photocell array 40 comprises a plurality of individual photocells 44. Screws (not shown) hold each light receptor group 18 in a predetermined position along a measuring axis.

Diaphragm 37 has an aperture which limits the width of the light beam in the $x$–$z$ plane, i.e., the general direction of the path of a projectile.

Each focusing lens 34 receives a light beam from a corresponding light source 12 and focuses the beam in the $x$–$z$ plane so that all the light can fall on the small photocells 44 of photocell array 40. The beam is not narrowed in the direction of collimation, but rather it is focused (i.e., condensed) in a direction orthogonal to both the direction of the beam and the direction of collimation. Focusing lens 34 is a cylindrical-type lens.

Figure 3:
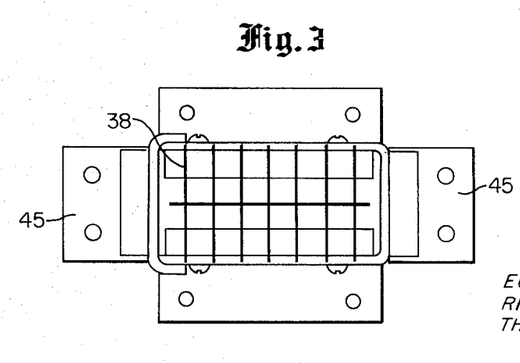
FIG. 3 is an view of a light receiving means showing an optical slit and a plurality of baffles.

Baffles 38 limit the angle of incidence of light which may be received by each photocell 44. For example, the photocells 44 of each photocell array 40 are compartmentalized by the spacing of baffles 38 so that each photocell may only receive light from directions within a small angle of the direction of the light beam from a corresponding light source 12 (the $x$ axis). The direction from which light can be received is defined by the width of slit 36 and the focal length of lens 34. Thus spurious light arriving at greater angles of incidence such as sunlight, or light from tracer bullets, for example, will be prevented from reaching photocells 44 by baffles 38, lens 34, and slit 36.

The light receptor group of the alternate embodiment 18', as shown in FIG. 2b, is identical with light receptor group 18.

Slit mask 36 comprises a flat sheet abutting the ends of baffles 38 which has a narrow slit for passing only the light beam from focusing lens 34 and for blocking stray light from impinging on the light receiving means. The slit is preferably located at the focal point of focusing lens 34. The width of the slit should be at least equal to the width of individual photocells 44. The size of the smallest image produced by lens 34 is given by the width of the aperture in diaphragm 35 times the focal length of lens 34 divided by the quantity given by the distance from diaphragm 35 to lens 34 minus the focal length of lens 34. This results in an image width of about 0.200 inch. The plane of photocells 44 is located slightly behind slit mask 36. Slit mask 36 limits the directions from which light may be received by photocell array 40 substantially to light which has passed through the aperture of diaphragm 37, i.e., light coming from the direction of the corresponding light source.

Each photocell array 40 comprises a plurality of individual photocells 44 which are sensitive enough to detect a decrease in light intensity when a light beam is interrupted by the passage of a projectile. The fall time of each photocell 44 must be sufficiently fast to produce a usable response for all projectile velocities of interest. Photocells 44 may be phototransistors or photodiodes which have response times such that projectile velocities in the order of 4,000 feet per second may be measured. Resolution of a projectile position is a function of width of each photocell 44 along the measuring axis. Resolution is also a function of the spacing between each photocell 44. In the preferred embodiment each photocell 44 has a width in the order of 0.020 inch and is spaced a distance of approximately 0.050 inch center-to-center from an adjacent photocell 44 on either side. The device is thus capable of determining the location of a projectile in increments far less than the width of a light beam from a light source 12. Each photocell 44 produces an output signal in response to impinging light from a corresponding light source 12. When a beam impinging upon a particular photocell 44 is interrupted by the passage of a projectile, the output of that photocell 44 will drop to zero for the duration of the beam interruption. It is this negative signal or lack of a signal from one or more photocells 44 which indicates the presence of a projectile.

In the first step of alignment, the attitude of the filament of lamp 28 may be tested by the use of a spherical lens and a glass having a grating inscribed thereon (not shown). The second spherical lens and grating may be mounted in a tube similar to but slightly larger in diameter than tube 32. The glass is mounted at the end of the tube at the focal point of the spherical lens. The tube is then slipped over tube 32. The spherical lens and the test apparatus focuses the collimated light beam emanating from lens 30 so that the image of the filament of lamp 28 is projected on the glass. The inscribed grating gives an indication whether the filament is out of alignment. In the $y$ axis, for example, the image of the filament should be horizontal. If it is not lamp 28 could be replaced or an adjustment could be provided to rotate lamp 28.

Each light source 12 must be aligned so that a collimated beam of light impinges upon the photocells 44 of a corresponding light receptor group 18. To facilitate alignment, lamp 28 is positioned at the approximate focal point of lens 30. In the first step of the alignment procedure the position of lamp 28 with respect to lens 30 is adjusted to produce a collimated beam of a desired width. This adjustment may be facilitated by replacing a light receptor group 18 with a mask (not shown) having scribed marks spaced apart a distance equal to the width of the collimated beam emanating from lens 30. For a light source 12 located along the $y$ or vertical axis of FIG. 1, the scribe marks would be positioned horizontally to measure distance in the $y$ direction. The position of lamp 28 is then adjusted to produce a beam equal in width to the spacing of the scribed marks.

In the final step of the adjustment procedure, the position of the light source 12 is adjusted with respect to the position of the corresponding light group 18. This adjustment may be facilitated by the use of a mask (not shown) which is placed over light source 12. The mask has a narrow slit equal in width to the width of an individual photocell 44. The slit is located at the midpoint of the diameter of lens 30. For a light source 12 located along the $y$ axis, the slit would extend horizontally. The same mask used in place of the light receptor group 18 for adjusting the collimation of the beam may also have a pair of scribe marks located at the boundary lines of the middle photocell 44 in a light receptor group 18. For a light receptor group located along the $y$ axis, the scribe marks would also be horizontal. The position of light source 12 along the $y$ axis is adjusted to cause the narrow beam passing through the adjustment mask over the light source 12 to fall within the scribe marks on the opposite adjustment mask which indicate the position of the middle photocell 44 of a corresponding light receptor group 18. The masks are then removed and the light receptor group is installed and held in place by mounting tabs 45. Thus a collimated light beam from a light source 12 is spread across the individual photocells 44 of a corresponding light receptor group 18.

In the device as described thus far, the location and diameter of a projectile along a measuring axis would be indicated by signals corresponding to a reduction of light from a number of photocells 44. While it would be clearly possible to utilize such signals individually by connecting each photocell 44 to an individual amplifier, for example, it is impractical to do so in a target system utilizing a large number of photocells 44.

Figure 4:
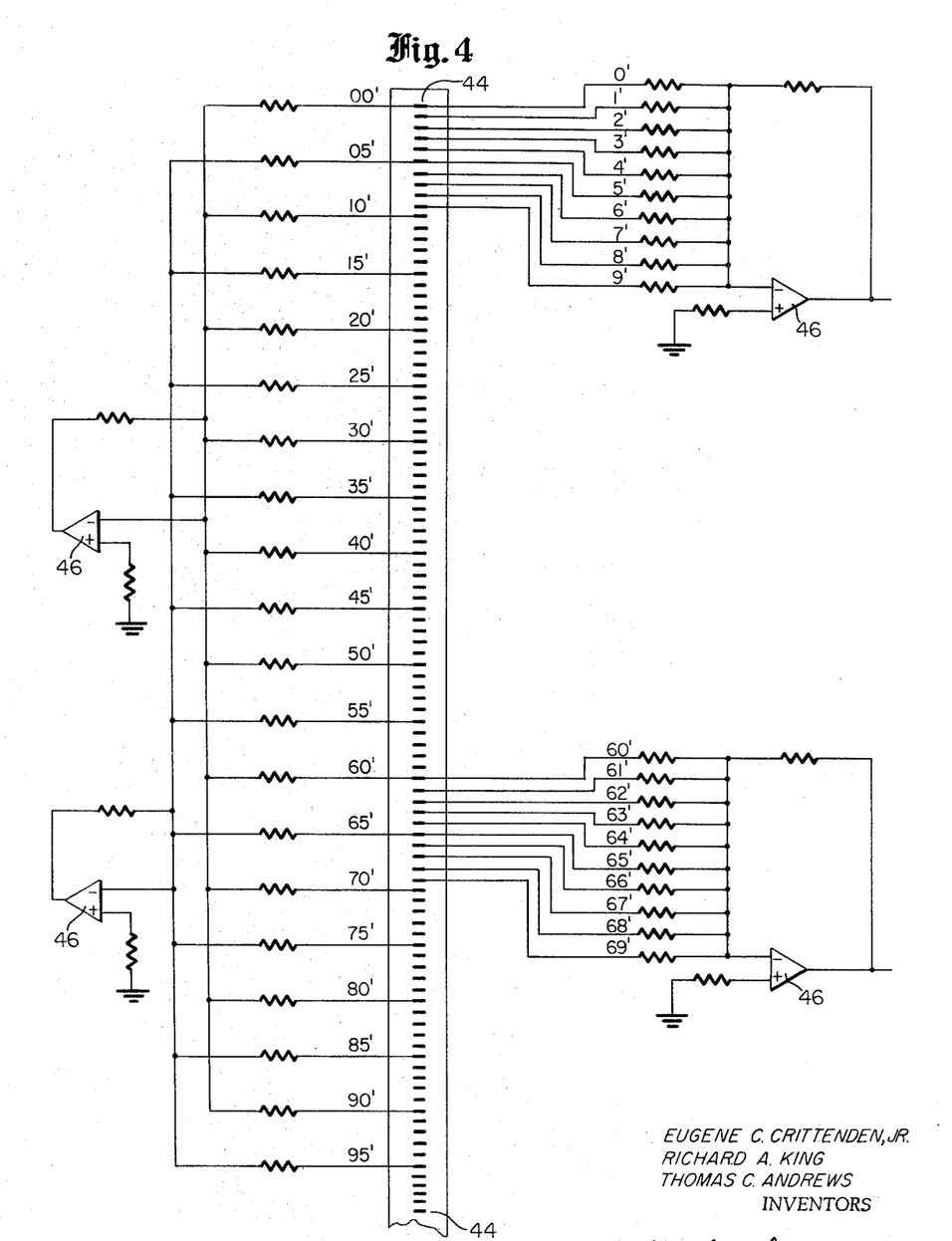
FIG. 4 is a schematic view of the preferred embodiment showing a plurality of light receptors and a portion of the corresponding circuit means for producing output signals.

FIG. 4 shows one means for coding the output signals from the plurality of photocells 44 which substantially reduces the number of amplifiers required to process the output signals. The coding system utilizes a plurality of identical operational amplifiers 46 to perform a summing operation on the outputs of photocells 44 while simultaneously amplifying the summation to a predetermined level. FIG. 4 represents a division of a plurality of receptor groups 18 into regions and zones. For purposes of illustrating the technique of summing the photocell outputs each region may be thought to include a plurality of receptor groups 18 having a predetermined number of receptor cells along an axis of measurement. The regions are illustrated in FIG. 4 in the direction of the y axis. Exactly the same representation applies to the photocells 44 positioned along the x axis. Each region is subdivided into zones. In the example shown in FIG. 4 there are ten regions with ten zones in each region. Each zone contains only one unit photocell 44. However, each zone could theoretically contain a plurality of photocells in which case a third level of connections would be required to subdivide to a unit photocell 44.

A total of 20 amplifiers are required for each axis for the example of FIG. 4, one amplifier corresponding to each of ten regions and one amplifier corresponding to each unit within one region. However, only two "units" amplifiers 46 and two "region" amplifiers 46 are illustrated in FIG. 4.

In the example shown in FIG. 4, each "units" amplifier 44 receives 10 inputs, one from each photocell 44 whose position corresponds to that unit; for example, units amplifier 46 has for the fifth photocell in each region inputs from cells 05', 15', 25', . . . 85' and 95'. Each "tens" amplifier 46 has ten inputs, one from each cell in the region, for example, "tens" amplifier for the sixth region has inputs from cells 60', 61', 62', . . . 68' and 69'. The encoding technique illustrated in FIG. 4 reduces the number of amplifiers 46 required to process one signal to a total of twenty. The technique can be further extended to reduce the number of amplifiers. It is limited only by the ability of each photocell 44 to drive multiple loads and the complexity of the wiring.

The coding method illustrated in FIG. 4 utilizes base 10 coding, but other codings are readily adaptable to the scheme. In the general case, $m$ cells may be most efficiently coded in base $(m)$ $^{1/n}$ coding, where $n$ is the number of levels of coding utilized. For the earlier example, coding approximately 100 cells can be most efficiently done, given that four levels of coding are to be used, by $$(100)^{1/4} = 3.15 = \text{base } 4$$

arithmetic. (if the number of cells is not divisible by the radix chosen, "dummy" cells must be utilized to fill out to a perfect $n$th power of $m$.) For the present example, coding proceeds as if there were $4^4$ cells, even though some amplifiers have fewer inputs than others. The total number of amplifiers utilized is equal to $nm$. It should be noted that raising the number of levels of coding does not always imply that fewer total amplifiers will be used.

In order to obtain reasonable accuracy, the cells are generally arranged in such a manner that several are blanked by a passing projectile. Blanking several cells simultaneously will cause several amplifiers to change their output levels essentially simultaneously. For the purposes of calculation, all amplifier outputs have two logical states: "0" (not blanked) or "1" (blanked).

Consider now the operation of the targeting system of the invention. In FIGS. 1 and 2 projectile 50 is shown at different positions in its course through the target system. In FIG. 2 projectile 50 interrupts a portion of a light beam from a light source 12 thus causing a shadow to fall on only certain photocells 44 in one light receptor group 18. As projectile 50 passes through the target system portions of both vertical and horizontal light beams are interrupted. Changes in the output signals from horizontally positioned photocells and vertically positioned photocells provide a precise indication of the location and diameter of projectile 50. Since the beams of light are parallel or collimated, the span of photocells 44 which have changing outputs will be equal to the diameter of projectile 50. The midpoint of photocells 44 having changing outputs due to blanking by projectile 50 will be the average location of projectile 50 along either the x or the y axis.

Turning now to FIG. 4, assume the passage of projectile 50 through the targeting system interrupts the light to photocells 7', 8' and 9' within the tens 40' region. The tens amplifier for regions 40' (not shown) will change its output state in response to the passage of projectile 50 in response to the change in state of inputs from cells 47', 48' and 49'. Also the units amplifiers for unit cells 7', 8' and 9' (not shown) will change state due to the change in inputs from photocells 47', 48' and 49' respectively. The midpoint or average location of projectile 50 is represented by the change of state in photocell 48' since it is the median photocell of a total of three photocells changing state. Thus the location of projectile 50 along one axis has been converted to a digital form at the outputs of amplifiers 46. Similarly, photocells 44 along the other axis will change output state in response to the interruption of light beams by projectile 50. These output signals from photocells 44 are converted by corresponding amplifiers 46 to give an indication of the position of projectile 50 along the x axis. The signals may be processed by a digital computer (not shown) or other device having a similar capability.

Figures 5A, 6:
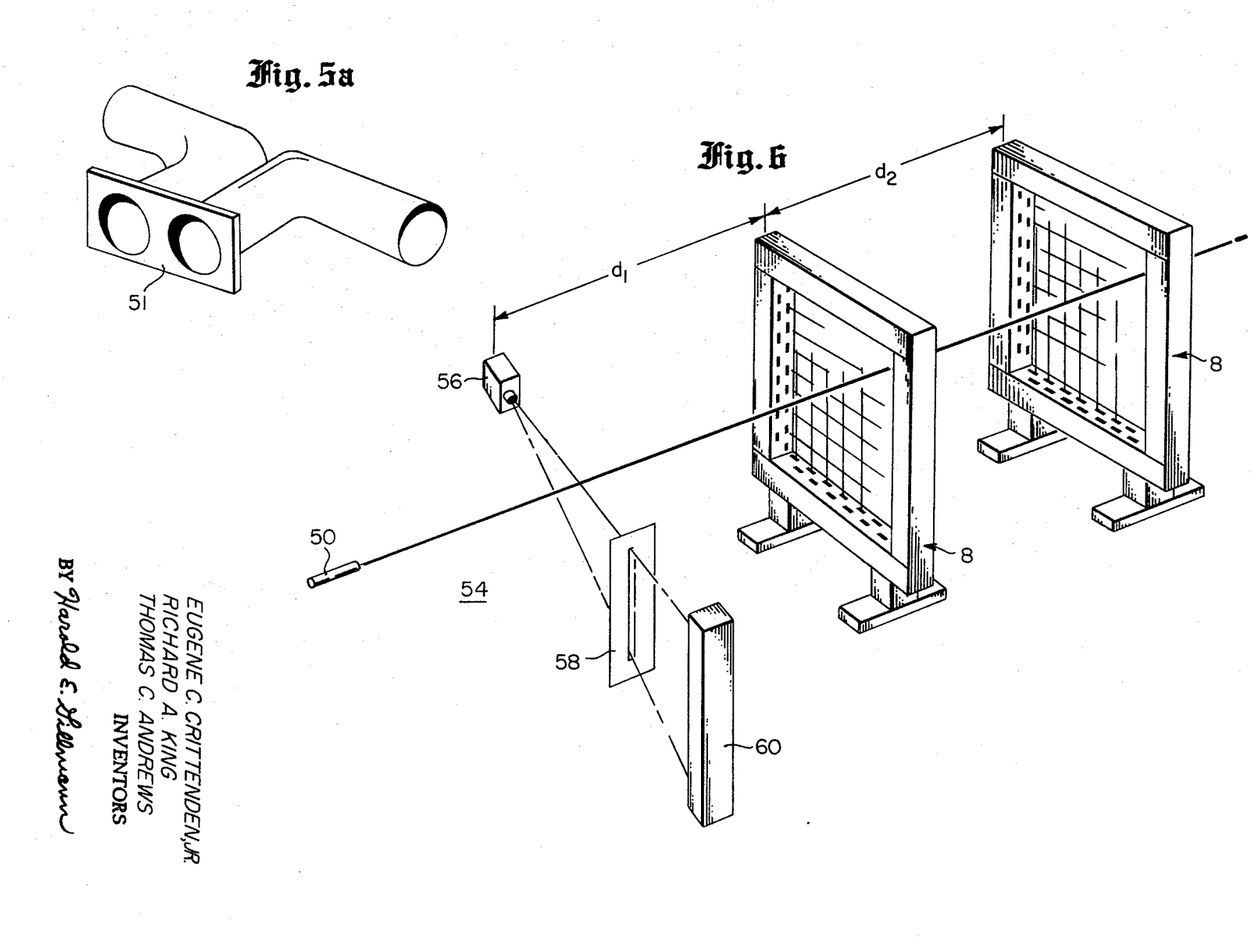
FIG. 5a is a perspective view of a light guide of an alternative embodiment.
FIG. 6 is a perspective view of a target system having a pair of target frames and a detector for indicating the start of the time of flight of a projectile.
Figure 5B:
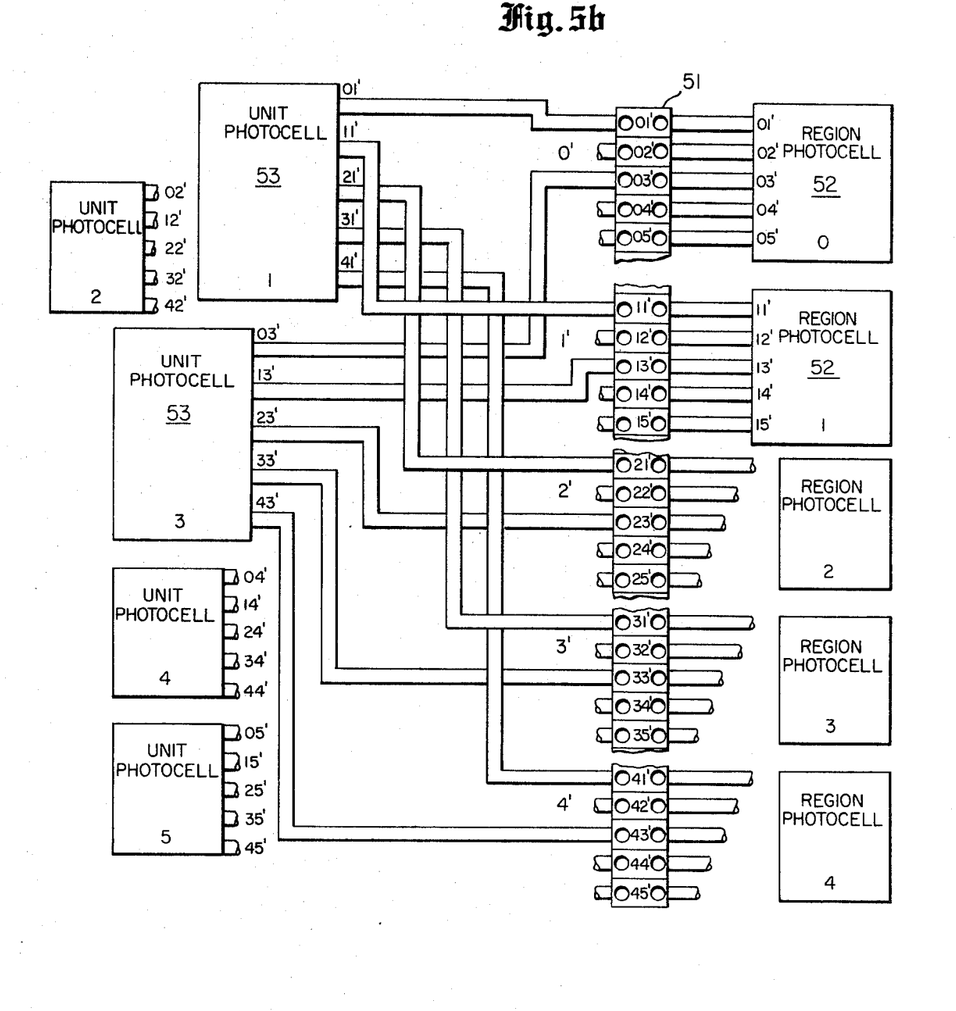
FIG. 5b is a schematic view of an alternative embodiment.

In an alternate embodiment of the target system shown in FIG. 5 light guides 51 direct impinging light to remotely located photocells 52. In this embodiment two or more light guides 51, as shown in FIG. 5A, replace each photocell 44 in the preferred embodiment. Several light guides 51 may be used in place of each receptor cell 44 to allow light to be guided to several remote photocells in accordance with the pattern for coding the output signals from the photocells. The coding pattern shown for this embodiment is similar to that used in the preferred embodiment in the sense that the remote photocells in the alternative embodiment and the amplifiers 46 in the preferred embodiment have multiple inputs in accordance with the same coding pattern. For example, the light guides 51 of the alternative embodiment may be assigned a position number in the manner illustrated for photocells 44 in FIG. 4. There is a corresponding region photocell 52 for each region of the light guides 51. Also, there is corresponding zone or unit photocell 53 for each zone of a region. Each region photocell 52 receives an input from each light guide 51 in the region. Thus if a projectile interrupts a light beam to any light guide in a particular region, this interruption causes the light falling upon the corresponding region photocell 52 to decrease. The output of that photocell 52 changes. This change is numerically coded and may be processed by a digital computer. Similarly, when a projectile to be scored traverses the plane of the target frame, it interrupts the light to a group of light guides 51 leading to unit or zone photocells 53. The output of the blanked unit photocells changes which provides an indication of the location and diameter of the passing projectile at the outputs of photocells 52 rather than at the outputs of amplifiers 46 as in the preferred embodiment.

In FIG. 6 there is shown an embodiment of the target system which utilizes two target frames 8 and a detector 54 for measuring the velocity and trajectory of a projectile 50. Each individual target frame will, of course, provide output signals indicating the location and diameter of a projectile 50 passing through it in the manner discussed above. Detector 54 may be any device which signals the beginning of the time of flight of a projectile 50. For a projectile fired by a rifle or other type of gun detector 54 may be a photo-optical muzzle detector. The muzzle detector shown in FIG. 6 includes an optical source 56 which projects a beam of light through optical slit 58 to photocell 60. The optical slit tends to prevent spurious light from impinging on the photocell. Projectile 50 interrupts the beam of light to the photocell to provide an indication of the beginning of time of flight. The elapsed time from the start of the flight until a target frame 8 produces output signals indicates the time of flight of the projectile. A known distance, $d_1$, from detector 54 to a target frame 8 permits calculation of the velocity of the projectile. In the embodiment shown in FIG. 6, the projectile passes through two target frames 8 spaced apart by a second known distance, $d_2$. Each target frame 8 will provide an indication of the location of the projectile as it passes through. In addition, the location of the origin of the flight of the projectile is known. Thus the location of the projectile at three different points in its flight is available. From this information an indication of the trajectory of the projectile may be calculated either manually or, for example, by a digital computer (not shown). Alternatively, the velocity of a projectile can be calculated by displacing the vertical and horizontal light sources 12 and corresponding light receptor groups 18 by a known distance and measuring the time delay between signals from the two receptor groups. For example, one of the target frames 8 of FIG. 6 could contain a vertical system of light sources and receptors and the other a horizontal system of light sources and receptors.

FIGS. 4 and 5 illustrate a coding pattern based on the decimal number system. It is within the scope of the invention that the position of the light receptors along a measuring axis may be defined in any number system. Further, it is not necessary that the radix or base of the number system for the units or zone locations be equal to the radix of the number system defining regions. In the example of FIG. 4, five regions could each contain five individual photocells.

Similarly, the target system of the invention is not limited to a coding pattern having two levels. For example, the plurality of photocells along a measuring axis could be divided into regions, zones, and units. Each region having a plurality of zones and each zone having a plurality of individual or unit photocells. Three sets of amplifiers corresponding to the regions, zones and units respectively would then be required for numerically coding the output signals of the photocells.

Nor is the target system of the invention limited to photocells positioned in a straight line along a measuring axis. The photocells may be staggered in a repeating checkerboard pattern. For example, groups of five photocells along the measuring axis may be staggered in the direction of flight of a projectile. The outputs of the photocells may be combined according to a coding pattern which utilizes the relative staggering of each photocell within a group to produce a sequence of uniquely time-coded pulses.

What is claimed is:

1. A target system for locating the position of a projectile with respect to predetermined points in a measuring direction said target system comprising:

a plurality of light sources of parallel beams of light, each said light beam having a predetermined width in a measuring direction, the measuring direction being generally perpendicular to the projectile path;

a plurality of light receiving means positioned in the direction of said measuring axis and spaced apart from said plurality of light sources for defining a target area, each light receiving means in said plurality of light receiving means including a plurality of light receptors for receiving light from a corresponding one of said plurality of light sources, each said light receptor having a predetermined position along the measuring direction of said parallel light rays, each said light receptor producing a signal having a first state in response to impinging light from a corresponding light source and a second state in response to the interruption of light from a corresponding light source, each said light receptor receiving only a predetermined portion of the width of the light rays from a corresponding light source for producing a discrete output signal in response to the interruption of its predetermined portion of the light rays from a corresponding light source by a projectile; and a plurality of circuit means for expressing the location and diameter of a projectile interrupting light rays to said plurality of light receiving means in a predetermined number system, said plurality of circuit means less in number than the total number of said plurality of light receptors, each said circuit means corresponding to a character in the predetermined number system for producing unambiguous output signals, each said circuit means responsive to signals from predetermined light receptors according to a predetermined coding pattern.

2. The device as claimed in claim 1 wherein each said light source comprises an incandescent lamp in a collimating lens for producing a light beam having parallel rays.

3. The device as claimed in claim 2 wherein each said light source includes a focusing lens positioned to receive a light beam from said collimating lens, said focusing lens condensing the impinging beam in the general direction of the projectile path and transmitting an intensified light beam of substantially said predetermined width in the measuring direction to the corresponding plurality of light receptors.

4. The device as claimed in claim 1 wherein each said light source comprises a laser.

5. The device as claimed in claim 1 wherein each said light receptor and each said plurality of light receptors comprises a photocell for producing an output signal.

6. The device as claimed in claim 1 and further including a plurality of focusing lenses positioned in the vicinity of said plurality of light receiving means, each focusing lens positioned to focus substantially all the light from a corresponding one of said plurality of light sources in the general direction of the projectile path onto a corresponding light receiving means without altering said predetermined width of the light beam in said measuring direction.

7. The device as claimed in claim 6 and further including a plurality of slit masks for passing light arriving from the general direction of said plurality of light sources, each said slit mask positioned between a corresponding light receiving means and a corresponding focusing lens to block stray light from impinging on said corresponding light receiving means.

8. The device as claimed in claim 7 and further including a plurality of baffles for blocking spurious light, each baffle comprising a planar sheet, a portion of said plurality of baffles positioned between each slit mask and corresponding focusing lens and spaced along said measuring direction for substantially preventing each said light receptor from receiving spurious light from sources located at an angle from the direction of a corresponding light source.

9. The device as claimed in claim 1 and further including a plurality of diaphragms each having an aperture, each said diaphragm positioned between a light source and a corresponding light receiving means for limiting in the general direction of the path of a projectile the width of a light beam to the width of said aperture without altering said predetermined width of said light beam in the measuring direction.

10. The device as claimed in claim 1 wherein each light receptor in each said plurality of light receptors comprises at least two light guides and at least two photocells, each photocell responsive to impinging light directed to it by a corresponding light guide for producing an output signal.

11. The device as claimed in claim 1 wherein each said circuit means comprises an amplifier and wherein the total number of light receptors in the measuring direction is divided into numbered regions, each region having numbered zones for specifying the position of each light receptor in the measuring direction according to a number system, one amplifier from said plurality of amplifiers corresponding to each numbered region and one amplifier corresponding to each of said numbered zones, the signals from the light receptors in each said region being coupled to the input of a corresponding amplifier, the signal from the light receptor in the $n$th zone of each said region being coupled to the same corresponding amplifier, said plurality of amplifiers responsive to input signals from said light receptors for producing numerically coded output signals indicative of the region and zone numbers of light receptors blanked by a projectile interrupting light rays from said plurality of light sources.

12. The device as claimed in claim 1 and further including a second device of the type claimed in claim 1 orthogonally mounted with respect to the device of claim 1 to define a planar target area, said second device producing a second set of output signals for indicating the location of a passing projectile along the measuring axis of said second device whereby the output signals from the second device and the signals of the device of claim 1 indicate the coordinates of a projectile passing through the planar target area.

13. The device as claimed in claim 12 wherein the planar target area of said second device is displaced a known distance from the planar target area of the device of claim 1 to produce a time delay in the output signals from said second device for calculating the velocities of projectiles passing through both planar target areas.

* * * * *